United States Patent
Ruehrnschopf

[11] Patent Number: 5,416,817
[45] Date of Patent: May 16, 1995

[54] METHOD OF OPERATING A FAN BEAM COMPUTER TOMOGRAPHY APPARATUS

[75] Inventor: Ernst P. Ruehrnschopf, Erlangen, Germany

[73] Assignee: Siemens Aktiengesellschaft, Munich, Germany

[21] Appl. No.: 255,075

[22] Filed: Jun. 7, 1994

Related U.S. Application Data

[63] Continuation-in-part of Ser. No. 31,821, Mar. 16, 1993.

[30] Foreign Application Priority Data

Mar. 23, 1992 [DE] Germany .................... 42 09 375.9

[51] Int. Cl.$^6$ ............................................. G01N 23/00
[52] U.S. Cl. .................................... 378/19; 378/4
[58] Field of Search ....................................... 378/19, 5

[56] References Cited

U.S. PATENT DOCUMENTS 4,066,900  1/1978  LeMay .................................. 378/19
5,003,474  3/1991  Yamashita et al.

FOREIGN PATENT DOCUMENTS 231037  8/1987  European Pat. Off.

OTHER PUBLICATIONS

"Sampling in Fan Beam Tomography," Natterer.
"Applications of Number Theory to Numerical Analysis," Zaremba, ed. Academic Press, 1972.
Patents Abstracts of Japan, P-1122, Oct. 25, 1990, vol. 14 No. 490 (Application No. 64-19623).

*Primary Examiner*—Craig E. Church
*Attorney, Agent, or Firm*—Hill, Steadman & Simpson

[57] ABSTRACT

A fan beam computer tomography apparatus of the third generation has a measurement unit, including an x-ray source and a detector array, which rotates around a system axis, extending through an examination volume. The computer tomography apparatus is operated by dividing the detector elements of the detector array into groups for the data acquisition, and data acquisition of the output signals of the detector elements is controlled by undertaking the signal integration and the signal read-out simultaneously within a group, but chronologically offset in successive groups, with the chronological offset corresponding exactly to the time required for the measurement unit to rotate between successive projection directions.

1 Claim, 4 Drawing Sheets

METHOD OF OPERATING A FAN BEAM COMPUTER TOMOGRAPHY APPARATUS

This is a continuation-in-part of application Ser. No. 08/031,821, filed Mar. 16, 1993.

BACKGROUND OF THE INVENTION

1. Field Of the Invention

The present invention is directed to a method for operating a fan beam computer tomography apparatus of the third generation, having a measurement unit, including an x-ray source and a detector array, which rotates around the system axis.

2. Description of the Prior Art

In fan beam computer tomography systems of the third generation, having continuous irradiation of the examination subject, the arrangement of the detector elements and the conduct of the scanning should be undertaken to optimize the factors of image quality, data acquisition and processing time, and radiation stress on the patient. These factors are, to a certain extent, competing in the sense that maximizing one factor may require adjustment of the other factors. In general, however, it is always desirable to prevent the generation of scan artifacts and one strives to balance the goals of obtaining an optimally high image quality (topical and contrast resolution) with a given total number of measured data, obtaining a prescribed image quality with an optimally low radiation stress on the patient, and conducting the tomographic scanning of a large volume with a given data acquisition and processing time.

A problem associated with computer tomography systems of the third generation is schematically illustrated in FIG. 4. FIG. 4 shows a schematic illustration of the arrangement of components in a known third generation computer tomography apparatus, with reference to an x-y coordinate system. The focus 2 of an x-ray source (not separately shown) rotates around a focus circle 1, centered at 8, and a fan beam 3 emanating from the focus 2 is incident on a detector array 4 after passing through a measurement field 5. The detector array 4 is composed of a series of detector elements 7, which rotates in combination with the focus 2. Each detector element 7 has a width b, and the detector elements 7 have a center-to-center spacing d, shown exaggerated in FIG. 4 for explanatory purposes. In computer tomography systems of this type, the highest spatial frequency B which arises in the network data is defined by the detector with b, i.e., B=(approximately) 1/b. According to the Nyquist criterion, however, a scanning rate of at least ½d is needed to avoid aliasing. This means that the spacing d between detector elements cannot be greater than b/2. This is not physically possible, and therefore aliasing is inherent in an apparatus of this type.

One solution which has been proposed to avoid or minimize aliasing in a third generation computer tomography apparatus is the so-called "beam addition 2 mode" as disclosed in European application 0 231 037. This approach is schematically illustrated in FIG. 5. In the "beam addition 2 mode" the respective measured values from two neighboring detector elements 7 are combined to form an "artificial" measured value. This is shown in FIG. 5, wherein an "artificial" detector element N' is shown as a combination of the neighboring detector elements n−1 and n, and an adjacent "artificial" detector element n'+1 is shown as a combination of neighboring detector elements n and n+1. This approach satisfied the Nyquist criterion, however, resolution is low because the artificial detectors have a larger width than the actual detector elements 7.

Another approach which avoids or minimizes the problem of aliasing in a third generation computer tomography apparatus is disclosed in the article "Sampling in Fan Beam Tomograph," Natterer, Westfaelishe Wilhelm—Universitaet Muenster, Institut fuer Numerische und Instrumentelle Mathematik, Dec. 19, 1991, appearing in SIAM J. Appl. Math. 1992. In contrast to the above techniques, which try to satisfy the Nyquist criterion within each fan projection, i.e., making d<b as far as possible, Natterer discloses an approach wherein d within a projection is made much larger than b. This is schematically illustrated in FIG. 6. Natterer recognized that even though all detector elements 7 in the array 4 will have radiation incident thereon for each position of the fan beam, it is not necessary to use the data from every detector element per projection in order to construct the image. The Natterer approach is to use the data only from selected detector elements in the array within each projection, and these selected detector elements can be selected so as to be spaced from each other so that d within a projection is much larger than b. Of course, this means that far less data is obtained (or used) per projection. This means that many more projections must be undertaken in order to obtain (use) the measured values from each detector element. This is accomplished by employing an offset $\gamma = m \cdot \Delta\beta$, wherein $m = a + i/M$ for $i = 0, 1, \ldots M-1$, wherein A is an initial misalignment, and after M projections a is again reached.

Although the approach of Natterer is suitable for examining inanimate objects, it is not suitable for conducting examinations of human subjects, because of the high number of projections which are needed in order to obtain a complete data set from every detector. The necessity of conducting such a high number of projections would cause a human subject to be subjected to an unacceptably high radiation dose.

It is therefore a problem in the operation of third generation computer tomography systems to provide a method which avoids or minimizes aliasing, which is suitable for use in examining human subjects.

SUMMARY OF THE INVENTION

It is an object of the present invention to provide a method for operating a fan beam computer tomography apparatus of the third generation wherein a high image quality without scan artifacts is achieved given a short exposure time.

The above object is achieved in accordance with the principles of the present invention in a method for operating a computer tomography apparatus wherein the detector elements of the detector array are divided into groups for the data acquisition, and the data acquisition of the output signals of the detector elements is controlled such that the signal integration and the signal read-out ensue simultaneously within a group, but take place chronologically offset in successive groups, with the chronological offset exactly corresponding to the time required for rotation of the measurement unit between successive projection directions.

The type of data acquisition arising within this method creates the prerequisite for the application of a modified convolution/back-projection algorithm for the image reconstruction, which is achievable given the current state of mathematical knowledge, as exemplified in the aforementioned article "Sampling in Fan Beam Tomograph", Natterer, Westfaelische Wilhelm-Universitaet Muenster, Institut fuer Numerische und Instrumentelle Mathematik, Dec. 19, 1991, in SIAM J. Appl. Math. 1992.

The method of the invention achieves an "electronic offset" which permits measured values to be obtained from all of the detector elements in the detector array in a short enough time span so that a human examination subject is not exposed to an undesirably high radiation dose, but the signal integration and signal read-out for the detector elements are conducted by electronically identifying groups of detector elements, and data acquisition from the respective groups of detector elements is offset from group-to-group by an amount of time corresponding to the time required for rotating the measurement unit between successive projection directions. This is thus an electrical analog to the mechanical rotation of the measurement unit explained above in conjunction with FIG. 6.

In contrast to the standard data acquisition known in the art, in the method disclosed herein the number of data contributions per projection direction is reduced, but the number of projection directions is increased, the objective being to cover the measurement field as efficiently as possible with measuring beams. The efficient coverage of the measurement field with beams can be interpreted in the sense of the mathematical theory of so-called good lattices for numerical integration of multi-dimensional functions, as described in "Applications of Number Theory to Numerical Analysis", Zaremba, ed., Academic Press, 1972.

The present invention proceeds on the basis of the number of detector elements which is standard in computer tomography systems of the third generation. For collecting the data, the detector elements are divided into groups, for example M groups, given a reduction of the data employed per projection by the factor M. These M groups are composed, for example, in the following way:

$0^{th}$ group: Element Nos. 0', 0'+M, 0'+2M, ... etc.

$k^{th}$ group: Element Nos. k', k'+M, k'+2M, ... etc.

(0', 1', ..., (M−1), may be a permutation of the sequence (0, 1, ..., (M−1).)

It is known in computer tomography systems of the third generation to dynamically shift the fan beam for increasing the number of measured data, and thus for improving the image quality. This is the aforementioned spring focus technique. In the method disclosed herein, the dynamic shift of the fan beam is replaced by the division of the detector array into groups and by the chronological offset in the data acquisition, however, the method disclosed herein may nonetheless be employed in combination with the spring focus technique.

DESCRIPTION OF THE PREFERRED EMBODIMENTS

Figure 1:
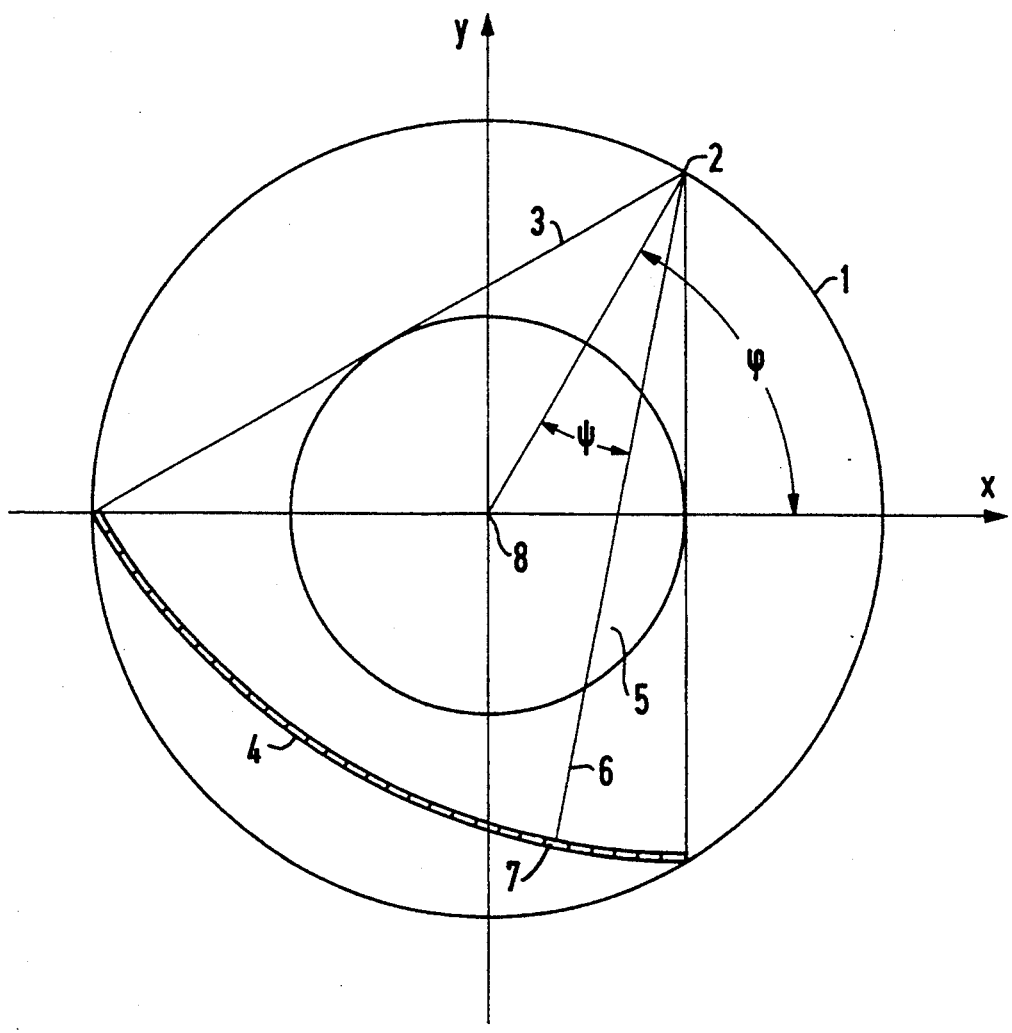
FIG. 1 is a schematic illustration of a fan beam computer tomography apparatus of the third generation diagramed for explaining the method of invention.

The focus circle 1 on which the focus 2 of an x-ray source (not separately shown) rotates in a third generation computer tomography apparatus is schematically shown in FIG. 1. The fan beam 3 emanating from the focus 2 is incident on a detector array 4, after passing through a measurement field 5. The detector array 4 is composed of a series of detector elements, and rotates in combination with the focus 2. The detector array 4 is curved around the focus 2. The output signals of the detector elements of the detector array 4 are supplied to a computer (not separately shown) which calculates an image of the examined slice of a subject lying in the measurement field 5, or calculates the image of a volume of the subject, and provides a visual reproduction of the image on a display.

An exemplary measurement beam 6 of the fan beam 3 is shown in FIG. 1 incident on a detector element 7. The angle between the measurement beam 6 and the beam proceeding from the focus 2 to the system axis 8 is referenced $\Psi$, and the angle between the abscissa of the coordinate system and the beam from the focus 2 to the system axis 8 is referenced $\psi$. The angle $\psi$ changes continuously as the focus 2 and the detector array 4 rotate around the focus circle 1, and defines the respective projection at which the signals of the detector elements of the detector array 4 are acquired. In accordance with the method disclosed herein, the angle $\Psi$ defines a sub-group of the detector array 4 of which signals are to be acquired.

Continuous rotation of the x-ray source and of the detector array 4 takes place by means of rotation of the measurement unit (not separately shown), on which those components are mounted, around the common system axis 8 at a constant angular speed w. A specific projection angle $\phi = wt$ is thus uniquely allocated for each time t during the system rotation, and vice versa.

A data point or measured value is calculated by the two angular coordinates $\Psi$ and $\phi$ of a measurement beam. A measurement beam is defined by the connecting line between the center of gravity of a detector element and the center of gravity of the focus 2 at a fixed time $t = \phi/w$. The measured signals of the individual detector elements are respectively collected and read out over an integration time interval dt. The middle of the integration time interval, or the corresponding projection angle $\phi$, is then allocated to the data point. A graph having the coordinates $\psi$ and $\Psi$ is known as a fan beam sinogram. The illustration of the coordinates of the data points in this sinogram constitutes a visualization of the scan grid (scan pattern). The term scan pattern is employed when information regarding the chronological course of the data acquisition are also embodied in the (statically portrayed) scan grid.

Figure 2:
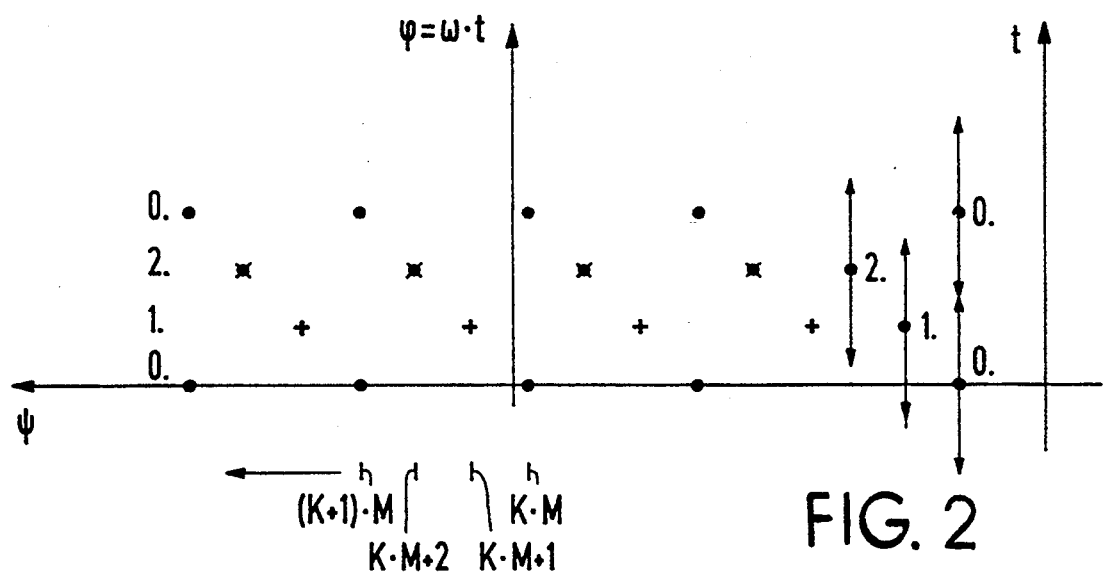
FIGS. 2 and 3 respectively show scan patterns for the detector elements obtained in the computer tomography apparatus of FIG. 1, operated according to the inventive method.

A scan pattern obtained in accordance with the principles of the present invention is shown in FIG. 2. In FIG. 2, the detector number is entered with k·M, k·M+1, etc., toward the left, and the detector group is entered with 0, 1, 2, 0 toward the top. For obtaining the pattern shown in FIG. 2, the number of detector elements which is standard in third generation computer tomography systems was not reduced (or at least was not significantly reduced). For collecting the data, however, the detector elements are divided into groups, for example, into M groups, with a reduction by the factor M of the data employed per projection. These M groups are composed, for example, as follows:

$0^{th}$ group: Element Nos. $0'$, $0'+M$, $0'+2M$, ... etc.

$k^{th}$ group: Element Nos. $k'$, $k'+M$, $k'+2M$, ... etc.

(The sequence $(0', 1', \ldots, (M-1))$, may be a permutation of the sequence $(0, 1, \ldots, (M-1))$.)

In FIG. 2, $M=3$ applies and the sequence is not permutated.

The data acquisition system is controlled such that the signal integration and signal read-out ensues simultaneously within a group (i.e., all detector elements within a group are simultaneously read-out and the signals integrated), but take place chronologically offset in successive groups. The chronological offset corresponds exactly to the time required for the measurement system to rotate between successive projection directions. The offset of the starting points for the data acquisition of the individual groups is entered by arrows at the right in FIG. 2, which represent the integration intervals for the detector groups. In order to utilize the radiation penetrating the patient without losses, the signal integration time given M detector groups extends over M successive projections. In the example of FIG. 2, the integration time corresponds to that which is present in a conventional scan pattern.

The dynamic shift of the fan beam 3 undertaken in known systems is thus replaced in accordance with the inventive method by the natural, static, spatial offset of the detector groups within the detector array and by the chronological offset in the data acquisition, however, the method disclosed herein can also be combined with such a known dynamic shift.

In the exemplary embodiment of FIG. 2, compared to known systems, the detector packing density has been diluted by a factor of two. In order to fully utilize the radiation, but not to lose the spatial resolution due to the detector elements having twice the width, the embodiment shown in FIG. 3 is employed.

Figure 3:
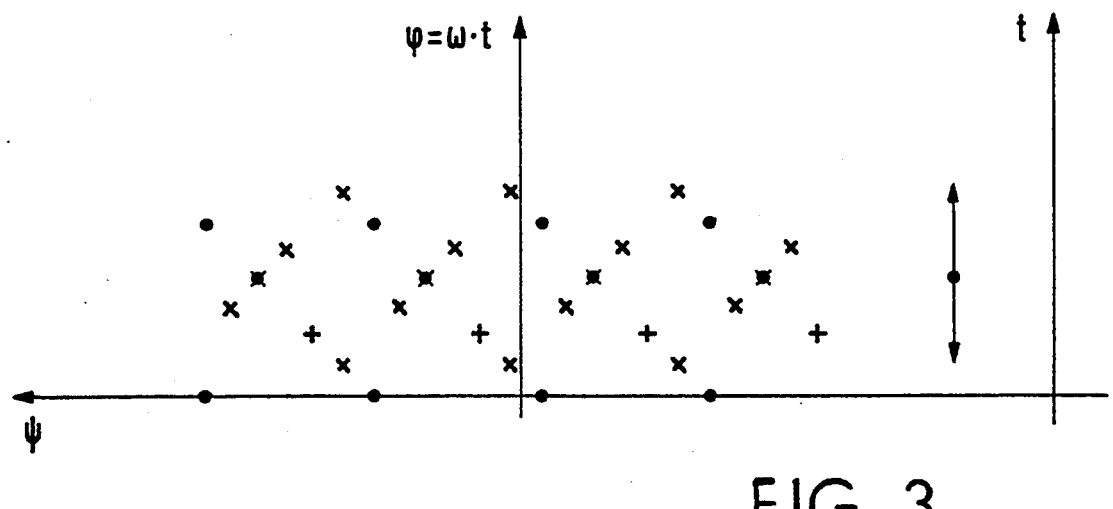
Figure 4:
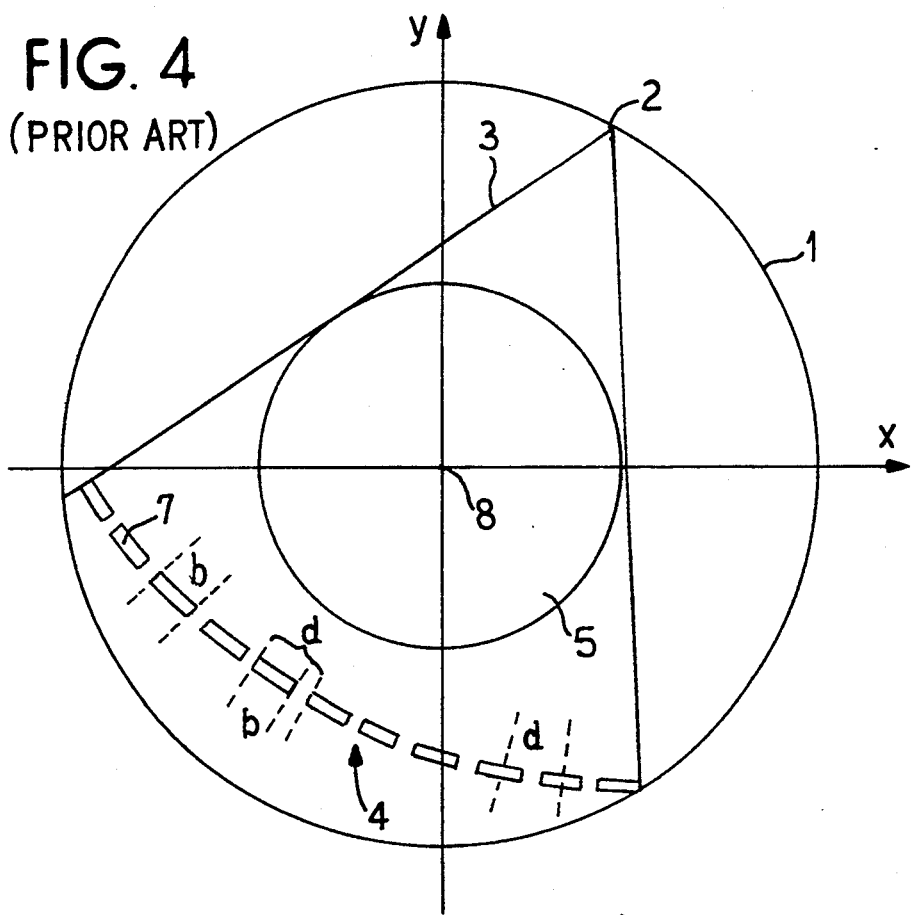
FIG. 4 is a schematic illustration of a known third generation computer tomography apparatus for explaining the problem of aliasing.
Figure 5:
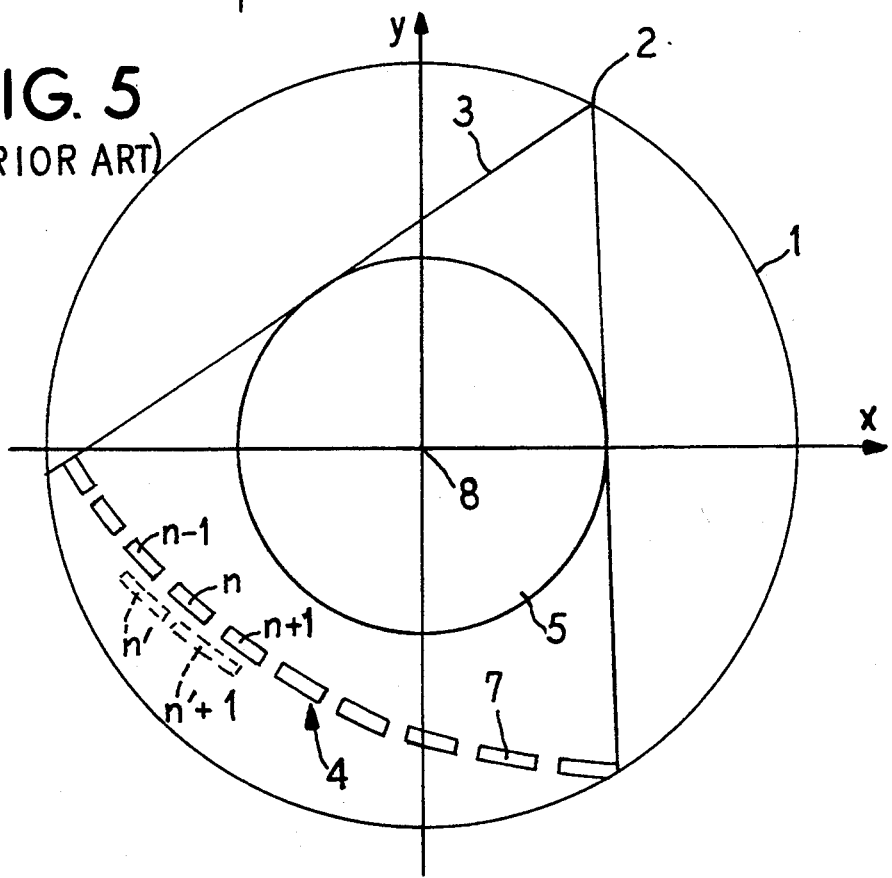
FIG. 5 is a schematic illustration of a known third generation computer tomography apparatus for explaining the "beam addition 2 mode" as described in European Application 0 231 037.
Figure 6:
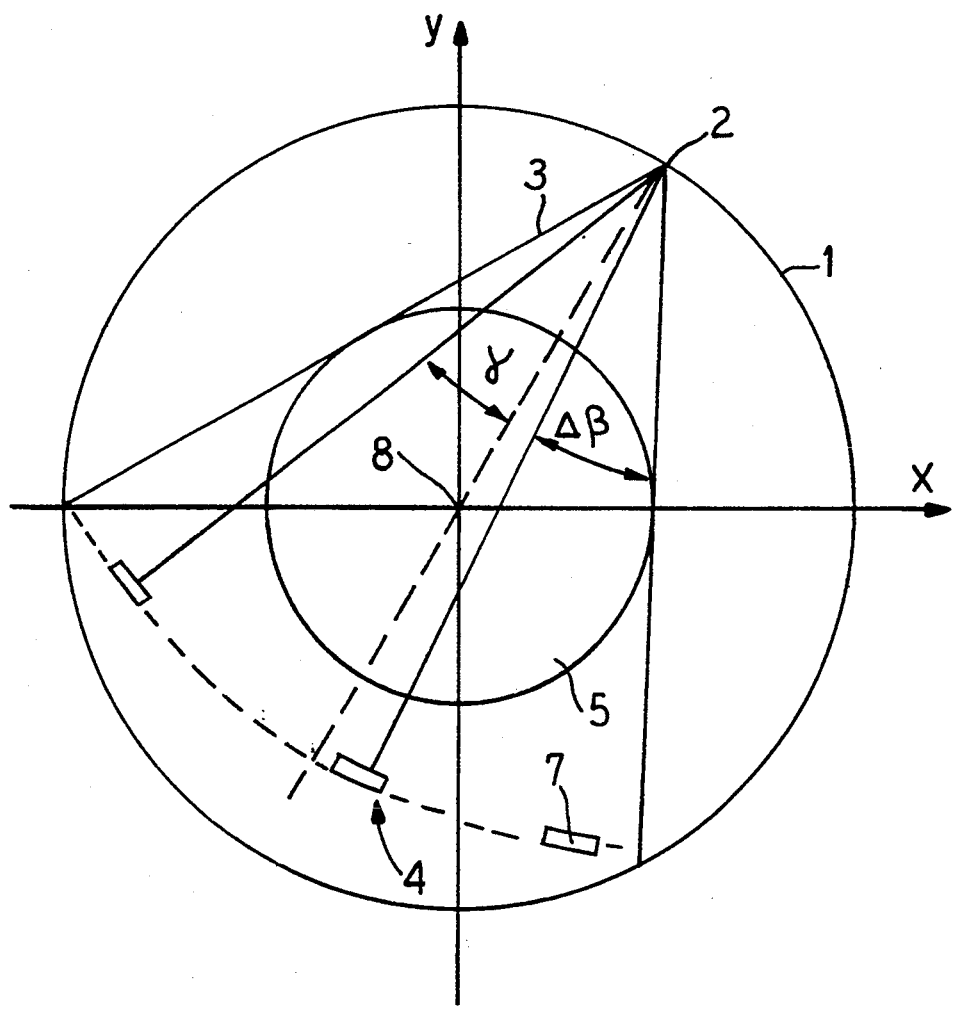
FIG. 6 is a schematic illustration of a known third generation computer tomography apparatus for explaining the approach to solving the aliasing problem by means of successive, offset projections.

In the embodiment of FIG. 3, full-packing density is employed, i.e., twice as many detector elements and thus twice as many data points, as in FIG. 2. The scan grid in FIG. 3 arises from the scan grid of FIG. 2 by superimposing the same (equivalent) scan grid obtained by mirroring with respect to the $\phi$ axis; and chronologically offsetting by half a projection element. The superimposed grid is identified with crosses in FIG. 3. This new scan grid is again of the type described above, but with $M=6$ detector groups. The two superimposed sub-scan grids are respectively efficient in the sense of the current state of mathematical knowledge. For the image reconstruction, the data of each sub-scan grid can be processed in parallel.

The variation of the fan offset can be achieved without undertaking a dynamic, mechanical shift and without the use of spring focus, and the radiation is fully utilized. Moreover, parallel processing of the data for image reconstruction is enhanced. As noted above, however, the spring focus technique can be utilized in combination with the method disclosed herein. It is also conceivable to switch between a data acquisition mode giving rise to the pattern shown in FIG. 2 and a data acquisition mode giving rise to the pattern of FIG. 3. It is also possible to switch between the known spring focus technique and one or both of the aforementioned more efficient data acquisition modes.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for operating a computer tomography apparatus of the third generation having a measurement unit composed of an x-ray source and a detector array consisting of a plurality of detector elements, comprising the steps of:

rotating said measurement unit around a system axis to irradiate an examination subject with an x-ray fan beam emanating from said x-ray source from a plurality of successive projection directions, each detector element generating a measurement signal corresponding to x-rays incident thereon;

dividing the detector elements of the array into a plurality of groups for acquiring said measurement signals from said detector elements;

successively acquiring the measurement signals from the detector elements in each of said groups by, successively from group-to-group, simultaneously conducting measurement signal integration and measurement signal read-out for all detector elements within a group;

chronologically offsetting the acquisition of said measurement signals in successive groups by a chronological offset from group-to-group corresponding to a time required for rotating said measurement unit between successive projection directions until measurement signals have been acquired from all of said groups; and constructing an image of said examination subject from all of said measurement signals from all of said groups of detector elements for all of said plurality of successive projection directions.

* * * * *